June 17, 1969 E. AGUET 3,449,908
GAS-STEAM TURBINE PLANT
Filed Jan. 24, 1967 Sheet 1 of 5

Inventor:
EMILE AGUET
BY
Kenyon & Kenyon
ATTORNEYS

United States Patent Office 3,449,908
Patented June 17, 1969

3,449,908
GAS-STEAM TURBINE PLANT
Emile Aguet, Winterthur, Switzerland, assignor to Sulzer Brothers, Limited, Winterthur, Switzerland, a corporation of Switzerland
Filed Jan. 24, 1967, Ser. No. 611,344
Claims priority, application Switzerland, May 6, 1966, 6,631
Int. Cl. F02c 3/00; F24h 1/10
U.S. Cl. 60—39.3                                       15 Claims

ABSTRACT OF THE DISCLOSURE

A gas-steam turbine power plant having a continuous water film formed on the walls of the combustion chamber to form steam under heat of the combustion gases to mix with the combustion gases. The water film provides a cooling effect on the chamber walls to protect against excessive heat.

---

This invention relates to a gas-steam turbine plant. More particularly, this invention relates to a gas-steam turbine plant having a combustion chamber wherein fuel is burned with air at a positive pressure. Still more particularly, this invention relates to a gas-steam turbine plant having a combustion chamber wherein a water film is maintained on an internal wall and generated steam is mixed with the combustion gases.

It has been known that the injection of water or steam into the combustion air or into the combustion gases of a gas turbine plant at a position between the exit from the compressor of the plant and the entry into the turbine of the plant results in an increase of the plant output. This, of course, has been accompanied by a simultaneous increase of the fuel consumption of the plant. It has been variously reported that the injection of water or steam amounting to 1% of the compressed air results in an increase of between 3 and 5% of the effective output of the plant, depending on the combustion pressure and entry temperature into the turbine. The amount of water injected has, however, been limited due to the fact that such injection has been accompanied by an increase of the combustion pressure, a feature which represents a pumping hazard for the air compressor. Moreover, in normal gas turbines, the injection of water has been accompanied by a large increase of the specific fuel consumption so that the injection has been generally regarded as inefficient and thus has been employed only for the purpose of supplying brief load peaks.

In order to overcome these disadvantages steam has been generated in a steam boiler heated by the gas turbine exhaust gas and mixed in the combustion gases instead of hot water. However, this boiler has complicated the plant and made it more expensive.

Finally, the injection of water has been connected with considerable difficulties relating to the combustion of the fuel. For example, if the water is directly injected into the firing zone of the combustion chamber, the combustion will be reduced so that the fuel is badly utilized. Further, if the injection takes place in the zone downstream of the combustion zone, the temperature of the gases upstream of the injection zone must be made correspondingly higher in view of the cooling of the combustion gases which takes place in such a procedure, thus causing the combustion chamber walls to be subjected to excessive thermal stresses.

Generally, the invention provides for the formation and maintenance of a water film on an internal wall of the combustion chamber of a gas-steam turbine plant in order to mix the steam generated from the film of water by the temperatures in the chamber with the combustion gases in the chamber. Since the transfer of heat to the water film takes place under particularly intensive conditions because of the direct flame radiation and the thermal transfer which accompanies the combustion pressure, the combustion chamber also operates as a highly efficient steam generator. However, the combustion chamber walls are protected against the elevated temperatures since the water film provides a cooling effect. Also since the entire water evaporation takes place around the combustion zone and not in the combustion zone itself, no deterioration of the combustion process results from evaporation of the water.

After leaving the combustion chamber, the mixture of combustion gases and steam is delivered to a turbine for expansion while giving up mechanical energy. It is known to be thermodynamically advantageous when the temperature of the mixture is as high as possible on entry into the turbine. On the other hand, it is also known that in view of the mechanical strength of the turbine parts in contact with this mixture, that this temperature must not exceed certain limiting value. Accordingly, in order to maintain the temperature of the mixture under control, as far as possible near the limiting value, additional water is injected and atomized through a nozzle system in the combustion chamber or in the pipeline which connects the combustion chamber with the turbine so that the evaporation of the additional amount of water results in a cooling of the mixture to the desired value. The injected amount of water may be regulated as a function of the temperature of the mixture at the inlet to the turbine. Since the injected water should preferably not penetrate into the combustion zone, the injection position is advantageously disposed sufficiently far downstream of the combustion zone.

When the mixture of combustion gases and steam is expanded in the turbine, the steam of course delivers an energy proportion which increases with an increasing ratio of steam quantity to gas quantity. However, while the power generated in the turbine as a result of the expansion of the combustion gases is used up to a large extent for driving the compressor which must deliver the combustion air into the combustion chamber, the power generated by the expansion of steam is available as active power practically without reduction, the driving power required by a water pump for delivering the water to the chamber represents only a small fraction of the power gained in the turbine. In regard to the power density of the plant, that is, the generated net power measured relative to the size of the turbine, it is therefore of advantage to select the ratio of steam to pure gas quantity as high as possible. Because of the evaporation system in the combustion chamber a high ratio is obtained without encountering the difficulties relating to the thermal stresses imposed on the combustion chamber or difficulties in connection with the combustion process.

Since a relatively high proportion of the total output is generated by the expansion of steam, it is of importance, in view of the specific fuel consumption of the plant, that the amount of energy generated by the expansion of the steam be as high as possible relative to the amount of heat which has to be provided for steam generation. This is achieved by raising the pressure in the combustion chamber in which evaporation takes place to a substantially higher value than is common practice in conventional combustion gas turbines. To achieve this purpose, the combustion air is compressed in two or more pressure stages and cooled between two successive stages. The amount of heat withdrawn from the air may be advantageously employed for preheating the water introduced into the combustion chamber for evaporation purposes so that the amount of fuel required for the evaporation of the water is correspondingly reduced.

Accordingly, it is an object of the invention to provide a gas-steam turbine plant of high ratio of output density with respect to plant cost.

It is another object of this invention to provide a gas-steam turbine plant suitable for peak load power stations.

It is another object of the invention to generate and mix steam in the combustion gases of a combustion chamber without subjecting the walls of the combustion chamber to excessive thermal stresses.

It is another object of the invention to control the temperature of a steam combustion gas mixture entering a turbine of a gas-steam turbine plant.

It is another object of the invention to provide a highly efficient gas-steam turbine plant which delivers a high power density.

These and other objects and advantages of the invention will become more apparent from the following detailed description and appended claims taken in conjunction with the accompanying drawings in which:

Figure 1:
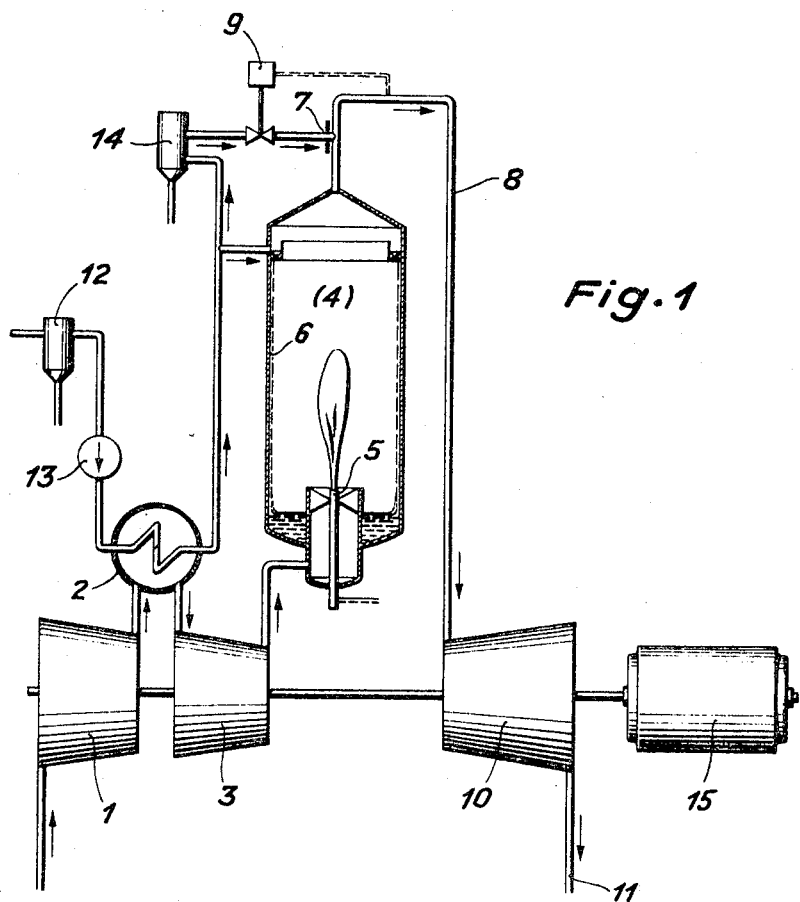
FIG. 1 illustrates a diagrammatic view of a first embodiment of a gas turbine plant according to the invention.

Referring to FIG. 1, a combustion air for a power plant is drawn from atmosphere and compressed to a final combustion pressure by means of a low-pressure compressor 1 and a high-pressure compressor 3. An intermediate air cooler 2 is disposed between the low-pressure compressor 1 and the high-pressure compressor 3 in order to cool the compressed air. The compressed air is then delivered from the high-pressure compressor 3 through a pipeline to a combustion chamber 4. The compressed air is mixed with fuel which is injected through a burner 5 to provide for combustion.

A supply of water is delivered to the combustion chamber in the form of a film which travels down the internal wall 6 of the chamber 4 facing into the combustion chamber. The resultant heat of combustion initially raises the combustion gases to a high temperature which is, however, immediately reduced because part of the heat is transferred to the water which flows along the internal wall 6 of the combustion chamber so that at least part of the water is evaporated to steam. The resultant steam mixes with the combustion gases and is simultaneously superheated. The mixture of steam and combustion gases is then ducted through a pipeline 8 to a turbine 10.

In order to cool the steam-gas mixture to the desired temperature additional water is injected and atomized in the pipeline 8 through a nozzle system 7. A temperature sensing element 9 is interconnected to the pipeline 8 for measuring the temperature of the gas-steam mixture and for controlling the amount of water injected in response to the measured temperature. If the additional water is injected predominantly in the center of the cross section of the pipeline 8, the temperature distribution of the mixture is further improved because the water evaporation permits cooling of the gas stream laminae closely adjacent to the walls only at the periphery of the combustion chamber. The mixture is expanded in the turbine 10 while giving up mechanical energy and then escapes through a flue 11 to atmosphere. The turbine 10 drives the compressors 1 and 3 and transfers effective power to an electric generator 15.

In order to prevent any impermissible salt deposits from accumulating on the internal wall 6 of the combustion chamber or in the turbine blading, the water is pretreated and substantially desalinated before introduction into the combustion chamber in a water treatment plan 12 which operates in accordance with one of the conventional and generally known methods for the treatment of boiler feed water. The pressure of the treated water is raised to the required value by means of a pump 13 and the water is then pumped through the intermediate air cooler 2 to be correspondingly pre-heated by the absorption of air compression heat and then introduced into the combustion chamber 4. After the water, which is injected through the nozzle system 7, has completely evaporated the water is desalinated in a second water treatment plant 14 to a higher degree of purity than the water introduced directly into the combustion chamber and which under some circumstances only partially evaporate.

Figure 2:
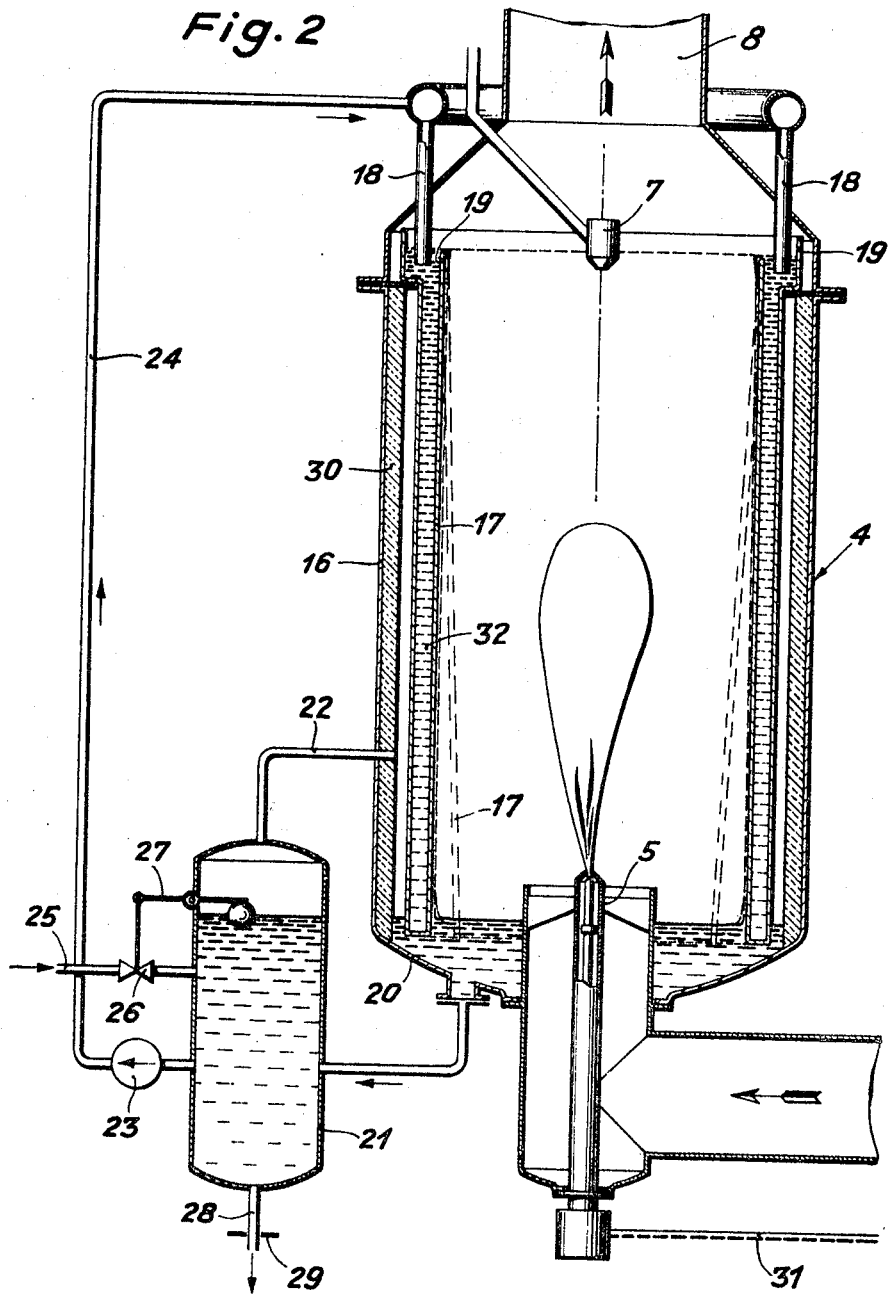
FIGS. 2 to 4 are sections through other embodiments of combustion chambers employed for a plant according to the invention.

Referring to FIG. 2, the combustion chamber 4 consists of an external pressure-tight shell 16 and an internal shell 17 which functions principally as a carrier for the water film and is thus advantageously constructed as a body of rotation, for example, a cylinder with a vertical axis. However, in order to improve the distribution of the water on the internal surface the shell 17 may also take the form of a slightly tapered body with a vertical axis and having a downwardly-reducing diameter, as shown in phantom. The water is introduced through pipelines 18 to the upper edge of the internal shell and distributed over the periphery via a distribution trough 19. The water flows towards the interior of the shell 17 over the internal edge of the trough 19 or through several holes drilled for this purpose, covers the entire internal surface with a film of water and finally reaches the lower part of the combustion chamber which is constructed as a collecting basin 20. As soon as the burner 5 is in operation and combustion of the fuel delivered through a pipeline 31 takes place, a large amount of heat is transferred to the water film so that part of the water is evaporated and only the residual part flows into the collecting basin 20.

The water in the collecting basin 20 is directed to a compensating vessel 21 having an upper part in communication with the combustion chamber through a pipeline 22. The water levels in the combustion chamber and in the compensating vessel are therefore maintained in the same plane. The water is returned from the compensating vessel by a circulating pump 23 and pipelines 24 and 18 into the combustion chamber. The circulating pump 23 is operated with a practically constant delivery to deliver a practically uniform amount of water per unit of time to the combustion chamber so that the internal shell 17 is always covered with a water film of sufficient thickness. The compensating vessel 21 is fed through a pipeline 25 with fresh water regulated by a regulating element 26 controlled by a level controller 27 so that the water level in the compensating tank and therefore in the combustion chamber is maintained. The lower part and the bottom of the combustion chamber are thus protected against overheating. Water may constantly be branched off in the form of blowdown water from the compensating vessel by means of a pipeline 28 and a regulating position 29 so that, despite evaporation, the salt concentration of the water delivered to the combustion chamber does not become excessive. By adapting this procedure it is not necessary to completely desalinate the fresh feed water treated by the plant 12 and supplied through the pipeline 25 to the compensating vessel, as such as procedure would considerably increase the treatment costs.

The shell 17 may also be cooled by water on the exterior to ensure against damage due to overheating if the water film should rupture due to certain flow conditions or if the water film does not completely cover the shell. This cooling may be applied in the same way as on the interior by means of a water film or in an even simpler manner by means of a water chamber as indicated in FIG. 2. Accordingly, the shell 17 is provided with two walls joined to each other at the bottom to form a tight seal. The water fed in through the pipelines 18 therefore completely fills the hollow space 32 between the two walls before flowing over the internal edge of the trough 19 to the interior of the shell 17. The exterior combustion chamber shell 16 which must withstand the internal pressure may be provided with an internal thermal insulation 30 for precautionary reasons so that the shell 16 is not exposed to overheating if the internal shell should be damaged during operation for some reason and the supply of fuel is not immediately shut down.

Figure 3:
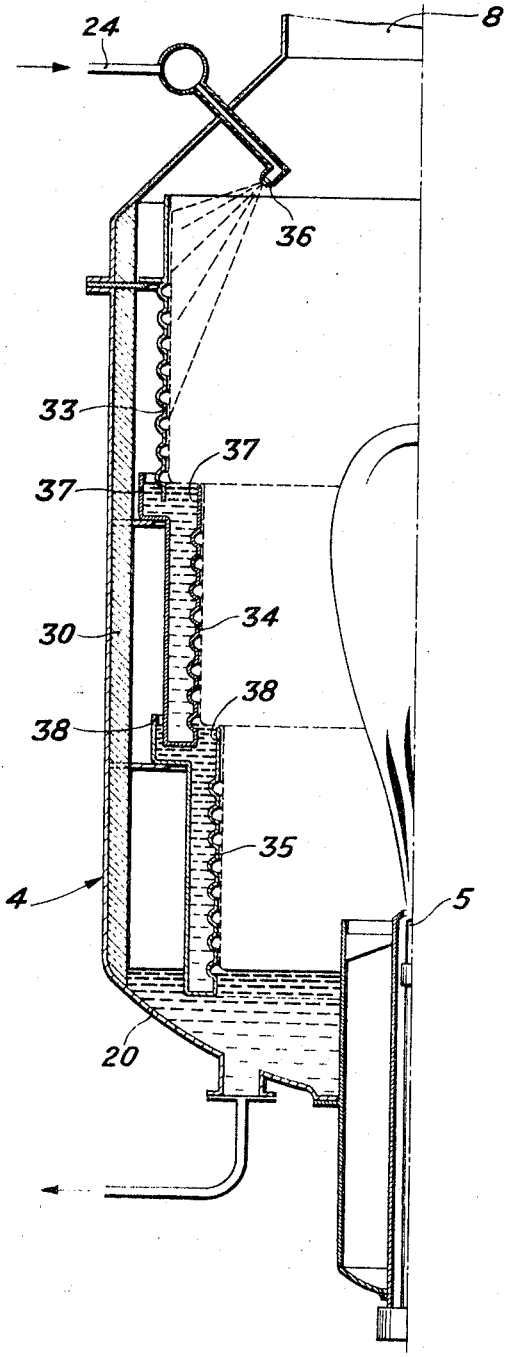

Referring to FIG. 3, several troughs are provided over the entire height of the shell to maintain a minimum thickness of water film on the internal surface of the shell 17, in order to insure uniform evaporation and to minimize the danger of rupture of the water film as well as to decelerate the dropping velocity of the water. Each troughs collects the water of the shell section disposed immediately above and redistribute the water directly over the shell section disposed immediately below. The water therefore begins to flow anew over each shell section with a small initial velocity. For example, for three superjacently disposed shell sections 33, 34 and 35 the water is distributed on the internal surface of the first section 33 not through the usual distribution trough but, in order to indicate an alternative manner, by means of several annularly disposed injection nozzles 36 which in turn are supplied by the feeder pipeline 24. Since the manner of injection through the combustion gases causes a certain direct evaporation of the water, the entire internal surface of the shells 33, 34 and 35 and therefore the dimensions of the combustion chamber may be correspondingly reduced for the purpose of generating a given amount of steam. The injection nozzles 36 deliver sufficient water so that, despite the direct method of evaporation, the shell section 33 is nevertheless covered with a film of water of sufficient thickness. The two other shell sections 34 and 35 are provided at their upper end with water distribution troughs 37 and 38 respectively which collect water flowing from the shell section disposed above the troughs and redistribute the water over the shell section disposed below. The shell sections 34 and 35, which are particularly exposed to the radiation of the flame, are provided with a double wall and water chamber as indicated in FIG. 2.

The shell wall may also be provided with local indentations or projections as a further means to reduce the dropping velocity of the water in the water film and to improve the distribution of the water over the entire internal surface of the shell 17 or of the shell sections 33, 34 and 35, respectively. For example, horizontal corrugations may be used which also stiffen the shell (FIG. 3). Another manner for achieving the same result consists in constructing the shell or the shell sections of perforated plate of close pitch design so that the dropping velocity of the water is reduced by the constant changes of direction and extension of the frictional path.

Figure 4:
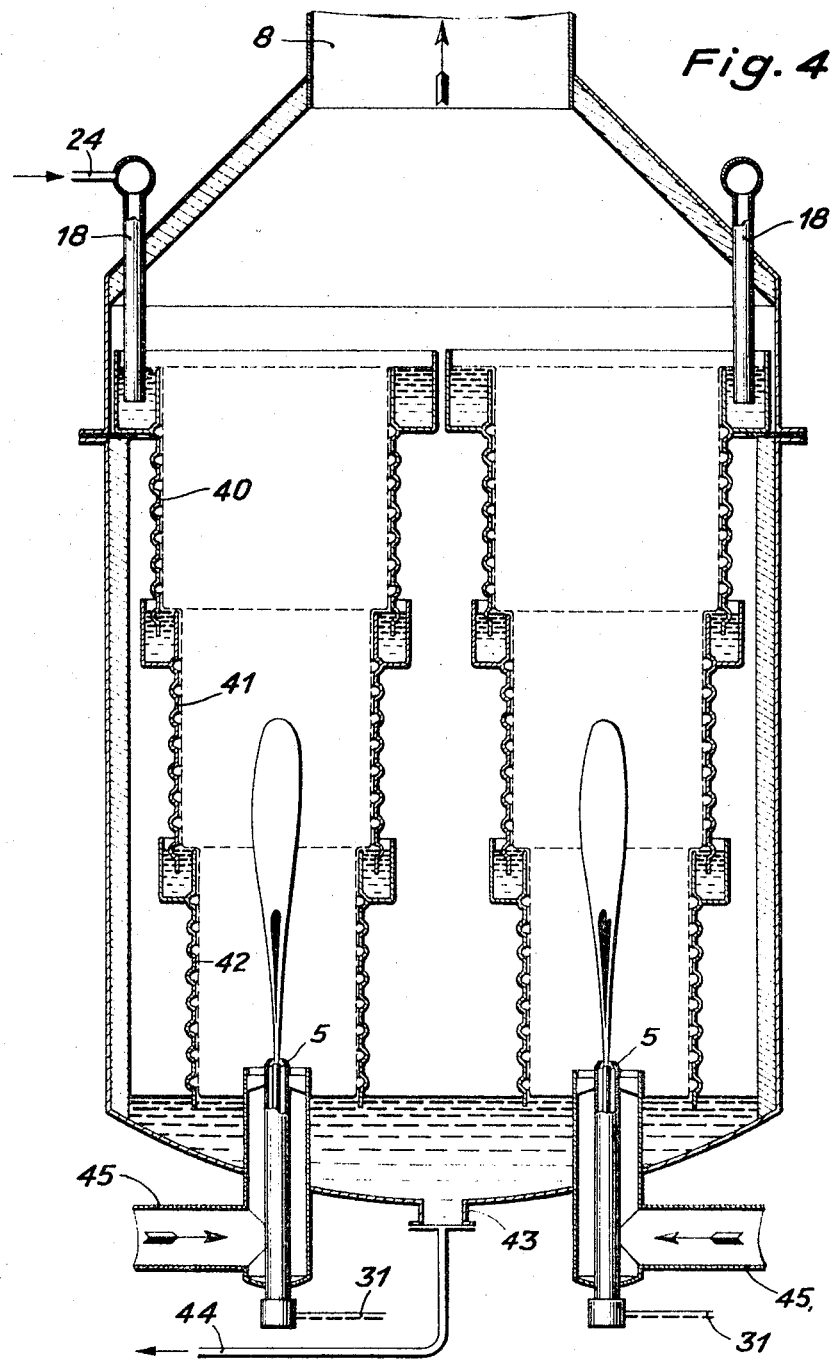

Referring to FIG. 4, in order to obtain a uniform distribution of the temperatures in the gas stream which is delivered through the pipeline 8 to the expansion turbine, the combustion chamber is equipped with several annularly disposed vertically upright burners regularly distributed over the bottom of the combustion chamber as well as with an identical number of adjacently disposed internal shells. The axes of the internal shells and of the burners respectively concide and the internal surfaces of all internal shells are covered with a film of water in a manner described. This insures that water is evaporated not only on the periphery of the combustion chamber but also over the entire cross section while the combustion gases are simultaneously cooled and the water in the form of steam mixes with the combustion gases. By this arrangement relative to the dimensions given for one combustion chamber, the overall surface area of the internal shells, which is covered with the water film, is enlarged and water evaporation is assisted. An internal shell, each consisting of three pieces 40, 41, 42, is disposed around the axis of each burner 5. Each piece 40, 41, 42 is provided at the upper edge with a water disrtibution trough and the topmost trough is supplied through the pipelines 18 in a manner described. The water introduced into the combustion chamber but no evaporated is returned through the discharge socket 43 and the pipeline 44 to the compensating vessel 21 (FIG. 2). The burners are each supplied through the pipelines 31 with fuel and through the pipelines 45 with combustion air.

As mentioned heretofore and with due reference to the effective output of the turbine or to the output density of the plant, it is of advantage if a large quantity of water is evaporated in the combustion chamber 4 and in the injection system of the pipeline 8 if such a system is provided. Given the same amount of combustion air and the same amount of burnt fuel, the amount of evaporated water may be increased by increasing the temperature of the water introduced into the combustion chamber. For this purpose, the water which is already pre-heated in the intermediate cooler 2 by the compression heat of the combustion air, may be heated still further by being passed through a heat exchanger which is heated by the exhaust gases escaping from the expansion turbine. Finally, this water may also be heated by external exhaust heat, for example by tap steam obtained from a steam power station in the immediate neighborhood or by the exhaust gas heat of a combustion gas turbine in the immediate neighborhood.

Figure 5:
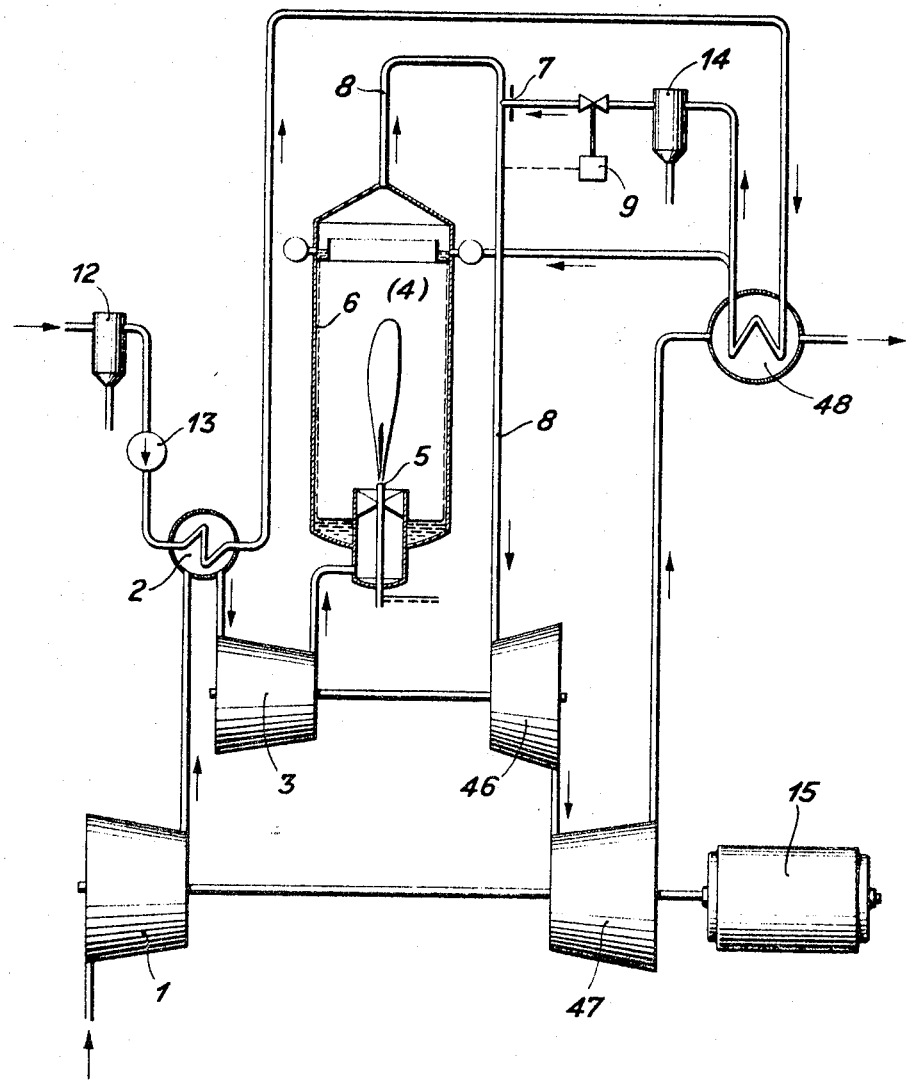
FIG. 5 is a diagrammatic view of a further embodiment of the plant according to the invention.

Referring to FIG. 5, an installation comprises a high-pressure turbine 46 which give up power for driving the high-pressure compressor 3 and a low-pressure turbine 47 which in turn drives the low-pressure compressor 1 and the electric generator 15. The high-pressure set comprising the machines 46 and 3 may be designed for a substantially higher speed than the low-pressure set comprising the machines 47, 1 and 15, so that the physical dimensions of the machines and in some circumstances the number of compression and expansion stages may be reduced. The air may also be compressed in more than only one low-pressure and one high-pressure compressor, intermediate cooling being applied to the air between two successive compressor so that the heat removed from the air can be at least partially utilized for pre-heating the water introduced into the combustion chamber 4 and injected into the pipeline 8. The water is heated still further in a heat exchanger 48 which is heated by the exhaust gases escaping from the turbine 47 before the water is evaporated. Thus, the invention is not confined to plants having a single expansion turbine and for design reasons it may be of advantage that any expansion gradients which may be available be distributed over two or more turbines.

The invention thus provides a gas-steam turbine plant in which the disadvantages mentioned heretofore do not occur and which achieves a particularly high output density compared with that of known plants, that is, a high output to plant cost ratio. Such a plant is therefore particularly suitable for peak load power stations, both for day peaks as well as for seasonal peaks, that is, for operating periods of up to 2000 hours per annum.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. In a gas-steam power plant including a combustion chamber for burning fuel under a positive pressure to produce heated combustion gases for a gas-steam turbine, said combustion chamber having a vertically disposed internal wall defining in part a combustion zone therein; said internal wall being disposed vertically and said combustion chamber having a burner in the bottom thereof with a vertical axis disposed within said internal wall means for forming and maintaining a substantially uniformly distributed water film on the face of said internal wall whereby steam is generated from said film under the heat of the combustion gases for mixing with the combustion gases.

2. A gas-steam power plant as set forth in claim 1 wherein said combustion chamber further includes an external shell concentrically spaced outside of said internal wall for withstanding internal pressure.

3. A gas-steam power plant as set forth in claim 1 wherein said internal wall is constructed as a body of rotation.

4. A gas-steam turbine plant as set forth in claim 3 wherein said internal wall is a conical body having a diameter increasing in the flow direction of the gases.

5. A gas-steam turbine plant as set forth in claim 3 wherein said face of said internal wall is provided with local indentations or projections.

6. A gas-steam turbine plant as set forth in claim 1 further comprising a collecting basin for excess water in the bottom of said combustion chamber and a circulating pump operatively connected to said collecting basin for delivering water from said collecting basin to an upper part of said internal wall.

7. A gas-steam turbine plant as set forth in claim 6 wherein means to regulate said pump to feed water into said combustion chamber at a rate to maintain a constant water level in said collecting basin.

8. A gas-steam turbine plant as set forth in claim 1 wherein said means includes a trough at the upper end of said internal wall for receiving water therein whereby water overflows from said trough to form said water film on said face of said internal wall.

9. A gas-steam turbine plant as set forth in claim 1 wherein said combustion chamber further includes a plurality of adjacently disposed internal shells uniformly distributed over the cross section of said chamber and an equal number of burners disposed in the bottom of said chamber, said means forming and maintaining a water film on the faces of each of said shells.

10. A gas-steam turbine plant as set forth in claim 1 further comprising a nozzle system in said combustion chamber for the injection and atomization of water into the mixture of combustion gases and steam.

11. A gas-steam turbine plant as set forth in claim 10 wherein said nozzle system includes a regulating device for regulating the quantity of injected water relative to the temperature of the mixture of combustion gases and steam.

12. A gas-steam turbine plant as set forth in claim 1 further comprising a plurality of compressor stages for the compression of combustion air introduced into said combustion chamber and a water-cooled intermediate cooler between adjacent compressor stages.

13. A gas-steam turbine plant as set forth in claim 1 further comprising a heat transfer unit downstream of the turbine utilizing the exhaust gases of the turbine to preheat the water to be evaporated in said combustion chamber.

14. In a gas-steam power plant including a combustion chamber for burning fuel under a positive pressure to produce heated combustion gases for a gas-steam turbine, said combustion chamber having a vertically disposed internal wall defining in part a combustion zone therein, said wall comprising a pair of spaced walls, said walls being joined at the respective bottom ends thereof to form a hollow space having an open upper end therebetween, and an external shell concentrically located outside of said internal wall for withstanding internal pressure; said internal wall being disposed vertically and said combustion chamber having a burner which directs a flame upwardly along a vertical axis within said internal wall, means for filling said hollow space between said pair of walls with water and for forming and maintaining a water film on the face of said internal wall whereby steam is generated from said film under the heat of the combustion gases in the combustion zone for mixing with the combustion gases.

15. In a gas-steam power plant including a combustion chamber for burning fuel under a positive pressure to produce heated combustion gases for a gas-steam turbine, said combustion chamber having a vertically disposed internal wall defining in part a combustion zone therein and a burner having a vertical axis disposed within said internal wall; means including a trough at the upper end of said internal wall for receiving water therein and a plurality of horizontal troughs axially spaced from said trough on decreasing diameters with decreasing height of said internal wall for collecting water flowing down the face portion of said internal wall disposed directly above and for redistributing the water over the face portion of said internal wall disposed immediately below whereby a water film is maintained on said internal wall.

References Cited

UNITED STATES PATENTS

| | | | |
|---|---|---|---|
| 893,084 | 7/1908 | Loomis | 126—359 |
| 1,102,345 | 7/1914 | Lemale | 60—39.3 XR |
| 2,078,956 | 5/1937 | Lysholm | 60—39.3 XR |
| 2,469,678 | 5/1949 | Wyman | 60—39.3 XR |
| 2,469,679 | 5/1949 | Wyman | 60—39.3 |
| 2,677,368 | 5/1954 | Janecek | 126—350 |

JULIUS E. WEST, *Primary Examiner.*

U.S. Cl. X.R.

60—39.26; 126—350, 359